US009674381B2

(12) United States Patent
Ikejima et al.

(10) Patent No.: US 9,674,381 B2
(45) Date of Patent: Jun. 6, 2017

(54) ELECTRONIC DEVICE INCLUDING A JOB INFORMATION GENERATING DEVICE AND ACCESS MANAGING DEVICE, INFORMATION MANAGEMENT METHOD TO ENABLE THE ELECTRONIC DEVICE TO FUNCTION, AND A NON-TRANSITORY COMPUTER-READABLE STORAGE MEDIUM TO STORE A PROGRAM FOR THE INFORMATION MANAGEMENT METHOD

(71) Applicant: KYOCERA Document Solutions Inc., Osaka (JP)

(72) Inventors: Ayaka Ikejima, Osaka (JP); Tomihito Doi, Osaka (JP); Minoru Takahashi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/984,680

(22) Filed: Dec. 30, 2015

(65) Prior Publication Data
US 2016/0196092 A1 Jul. 7, 2016

(30) Foreign Application Priority Data

Jan. 6, 2015 (JP) ................................ 2015-001199

(51) Int. Cl.
*H04N 1/00* (2006.01)
*G06F 9/54* (2006.01)
*G06K 15/02* (2006.01)

(52) U.S. Cl.
CPC ............. *H04N 1/0032* (2013.01); *G06F 9/54* (2013.01); *G06K 15/02* (2013.01); *H04N 2201/0094* (2013.01)

(58) Field of Classification Search
CPC ..................................................... H04N 1/0032
USPC ........................................................ 358/1.15
See application file for complete search history.

(56) References Cited

U.S. PATENT DOCUMENTS

| 2003/0177332 A1* | 9/2003 | Shiota | G06F 12/109 711/203 |
| 2011/0199623 A1* | 8/2011 | Okuyama | H04N 1/00408 358/1.9 |
| 2011/0211220 A1* | 9/2011 | Yamada | G03G 15/5016 358/1.15 |

FOREIGN PATENT DOCUMENTS

JP 2003-316588 A 11/2003

\* cited by examiner

*Primary Examiner* — Jacky X Zheng
(74) *Attorney, Agent, or Firm* — Stein IP, LLC (57) ABSTRACT

Provided are an electronic device, an information management program, and an information management method that help reduce the amount of memory for job information. An MFP (electronic device) has a job information generating device which generates, for each job executed by application software, job information including settings used by the application software that executes the job, and an access managing device which manages, when the job is executed, access to the job information from the application software. The job information generating device duplicates general job information including general setting items to generate preliminary job information, accepts, for the job, values for setting items included in the preliminary job information, and then generates the job information such that it includes, out of settings included in the preliminary job information, only settings used by the application software.

9 Claims, 11 Drawing Sheets

24 JOB INFORMATION GENERATION TABLE

|  | APPLICATION SOFTWARE | | | |
|---|---|---|---|---|
|  | PRINT | COPY | FAX TRANSMISSION | ... |
| IMAGE INPUT SETTINGS | × | ○ | ○ | ... |
| EXTERNAL INPUT SETTINGS | ○ | × | × | ... |
| PRINT OUTPUT SETTINGS | ○ | ○ | × | ... |
| EDIT SETTINGS | ○ | ○ | ○ | ... |
| XXX SETTINGS | × | ○ | ○ | ... |
| YYY SETTINGS | ○ | × | × | ... |
| ZZZ SETTINGS | × | ○ | × | ... |
| DESTINATION SETTINGS | × | × | △ | ... |
| ⋮ | ⋮ | ⋮ | ⋮ | ⋮ |

FIG.13

ELECTRONIC DEVICE INCLUDING A JOB INFORMATION GENERATING DEVICE AND ACCESS MANAGING DEVICE, INFORMATION MANAGEMENT METHOD TO ENABLE THE ELECTRONIC DEVICE TO FUNCTION, AND A NON-TRANSITORY COMPUTER-READABLE STORAGE MEDIUM TO STORE A PROGRAM FOR THE INFORMATION MANAGEMENT METHOD

INCORPORATION BY REFERENCE

This application is based upon and claims the benefit of priority from the corresponding Japanese Patent Application No. 2015-001199 filed on Jan. 6, 2015, the entire contents of which are incorporated herein by reference.

BACKGROUND

The present disclosure relates to an electronic device, an information management program, and an information management method that access job information including settings used by application software that executes a job.

Typical electronic devices permit access to the same information from a plurality of processes.

However, in typical electronic devices, when job information including settings used by application program that executes jobs is generated in memory, it is generated to have a fixed structure irrespective of the kind of jobs to be executed. Thus, in typical electronic devices, the job information that is used by application software when it executes a particular kind of job includes not only those settings which are used during the execution of that job but also such settings as go unused. This often results in the job information unnecessarily occupying an area in the memory.

SUMMARY

According to an aspect of the present disclosure, an electronic device includes a job information generating device and an access managing device. The job information generating device performs processing to generate, for each job executed by application software, job information including settings used by the application software that executes the job. The access managing device performs processing to manage, when the job is executed, access to the job information from the application software. Moreover, the job information generating device performs processing to duplicate general job information including general setting items to generate preliminary job information, accept, for the job, values for setting items included in the preliminary job information, and then generate the job information such that the job information includes, out of settings included in the preliminary job information, only settings used by the application software.

BRIEF DESCRIPTION OF THE DRAWINGS

FIG. 5 shows functions performed by the control portion shown in FIG. 1;

DETAILED DESCRIPTION

Hereinafter, an embodiment of the present disclosure will be described with reference to the accompanying drawings.

First, a configuration of an MFP (multifunction peripheral) as an electronic device according to an embodiment of the Patent Document will be described.

Figure 1:
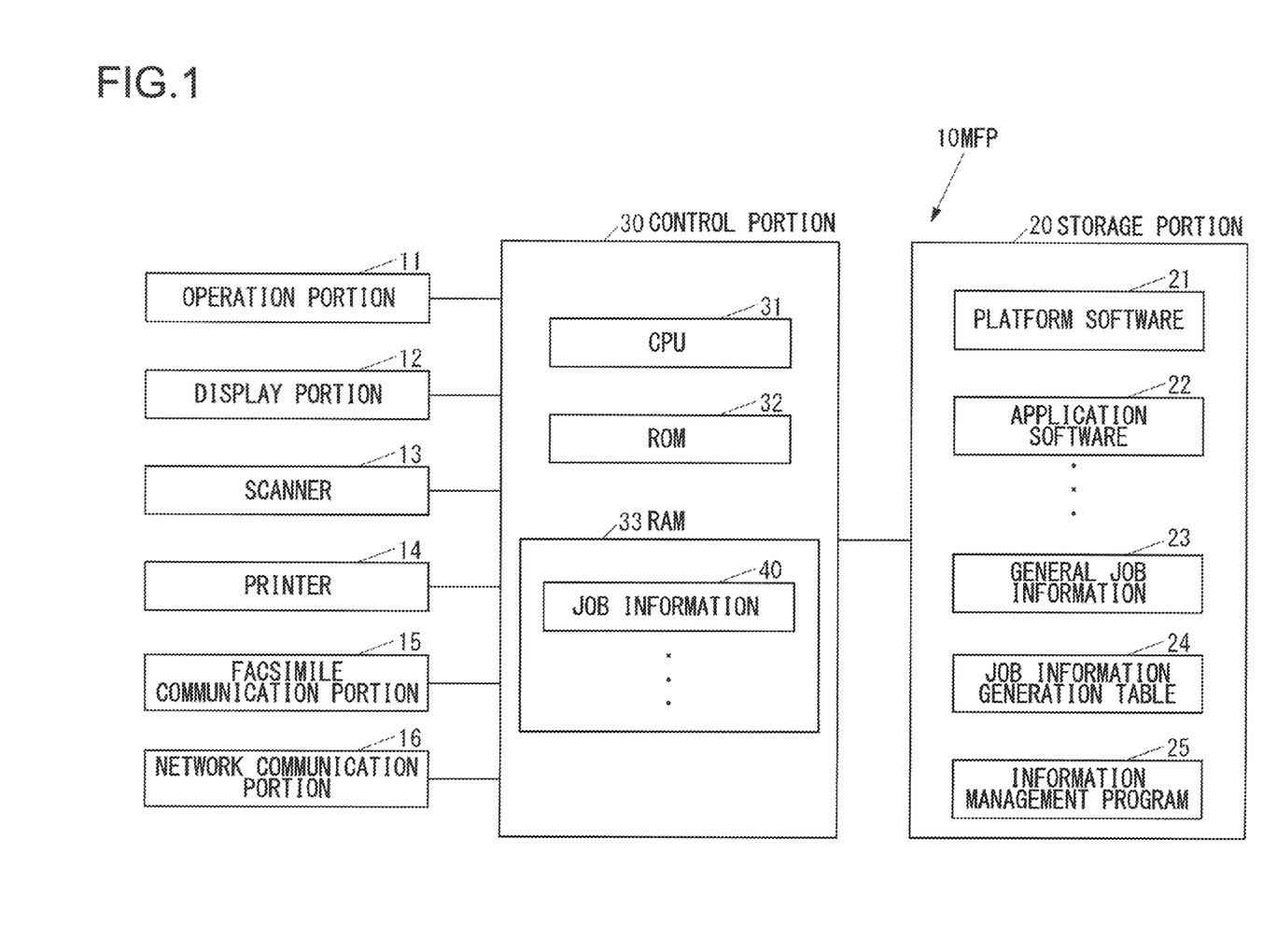
FIG. 1 shows a configuration of an MFP according to an embodiment of the present disclosure.

FIG. 1 shows the configuration of an MFP 10 according to an embodiment.

As shown in FIG. 1, the MFP 10 includes an operation portion 11 as an input device comprising buttons and the like operated for miscellaneous input by a user; a display portion 12 as a display device such as an LCD (liquid crystal display) for displaying various kinds of information; a scanner 13 as a reading device for reading image data from a document; a printer 14 as a printing device for printing on a recording medium such as sheets of paper; a facsimile communication portion 15 as a facsimile device for conducting facsimile communication over a communication line such as a telephone line with an unillustrated external facsimile machine; a network communication portion 16 as a network communication device for conducting communication over a network such as the Internet with an external device; a storage portion 20 as a non-volatile storage device such as an EEPROM (electrically erasable programmable read-only memory) and a HDD (hard disk drive); and a control portion 30 for overall control of the MFP 10.

The storage portion 20 has an area for storing platform software 21 and an area for storing application software 22 which runs on top of the platform software 21 to execute jobs. The platform software 21 and the application software 22 are installed on the MFP 10 at the stage of manufacture of the MFP 10.

The platform software 21 is software common to a line of MFP products that embraces a plurality of models including the MFP 10. The platform software 21 can be manufactured before individual models of the same line are manufactured; to allow manufacture of a plurality of models, the platform software 21 has no such functions as depend on particular models of the line.

The application software 22 can be manufactured for, of all different models of the same product line, the model to which the MFP 10 belongs. The application software 22 has such functions as depend on, of all different models of the same product line, the model to which the MFP 10 belongs.

As the application software 22, a plurality of application programs are stored in the storage portion 20, including, for example, a display application program for controlling screen display by the display portion 12; a scanning application program for controlling the reading of image data by the scanner 13; a print application program for controlling printing by the printer 14 based on print data received via the network communication portion 16; a copy application program for controlling printing by the printer 14 based on image data read by scanner 13; a facsimile transmission application program for controlling facsimile transmission via the facsimile communication portion 15; and a facsimile reception application program for controlling facsimile reception via the facsimile communication portion 15.

The storage portion 20 serves as a basis for the generation of job information, which will be described later, and stores general job information 23 including general setting items.

Figure 2:
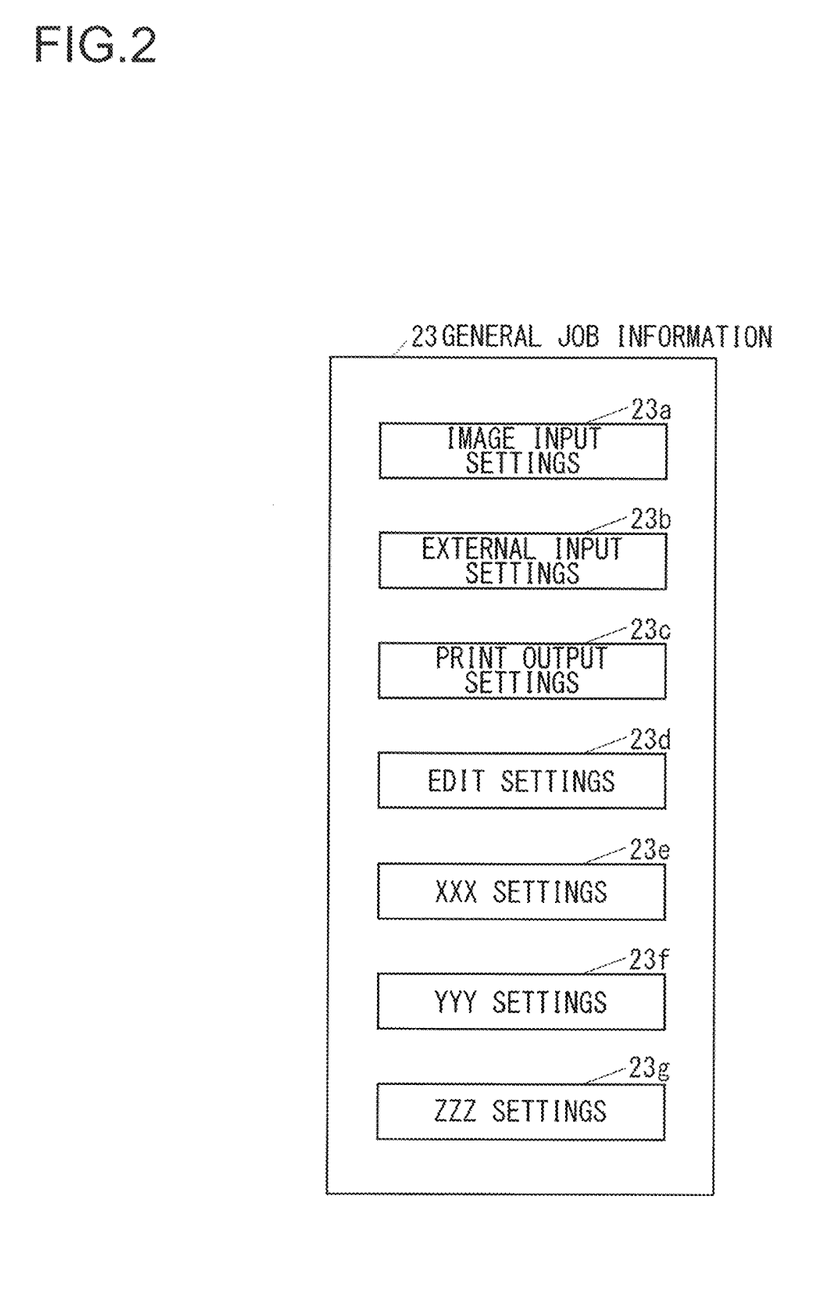
FIG. 2 shows an example of information included in the general job information shown in FIG. 1.

FIG. 2 shows an example of the information that is included in the general job information 23.

As shown in FIG. 2, the general job information 23 includes, as settings used by the application software, image input settings 23a related to the input of images by the scanner 13; external input settings 23b related to the input of images by the network communication portion 16; print output settings 23c related to printing by the printer 14; edit settings 23d related to the editing of input images; and XXX settings 23e, YYY settings 23f, and ZZZ settings 23g as other specific settings. Moreover, the general job information 23 includes, other than the settings used by the application software, structures for storing a various kinds of information that does not depend on the kind of jobs, such as a structure for storing job acceptance times and a structure for storing job names.

As shown in FIG. 1, the storage portion 20 stores a job information generation table 24 which is used for the generation of job information, which will be described later.

Figure 3:
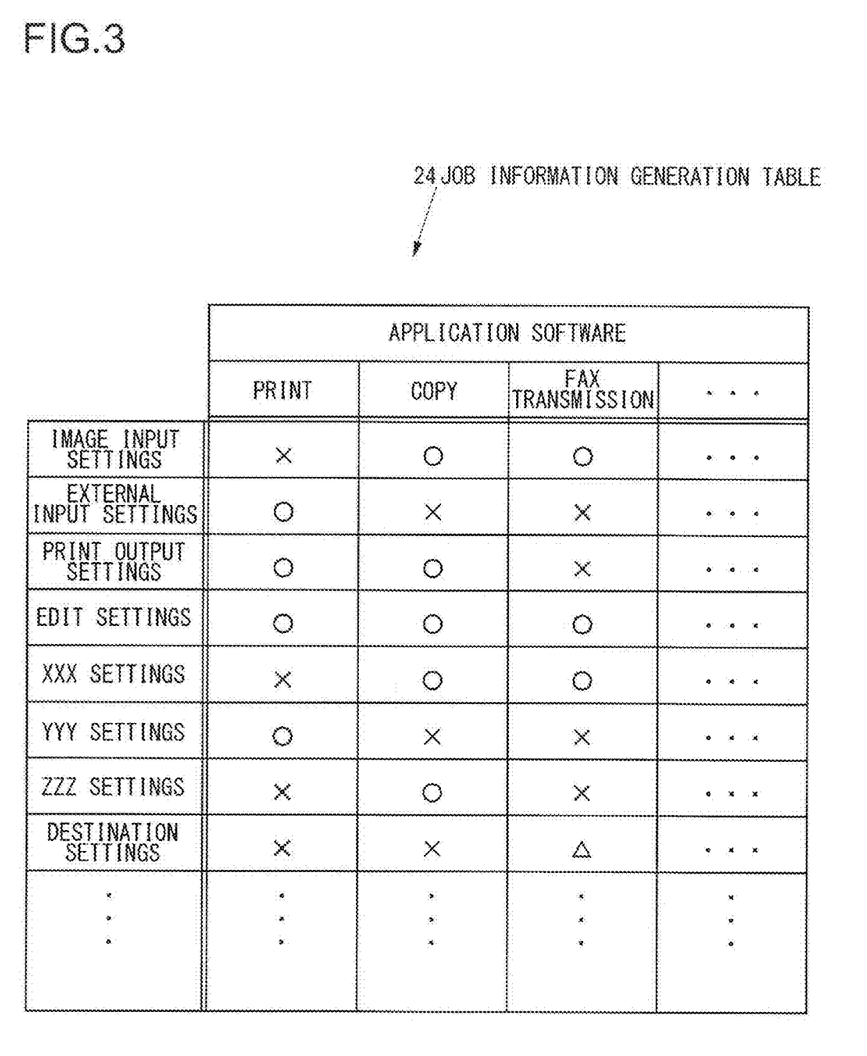
FIG. 3 shows an example of the job information generation table shown in FIG. 1.

FIG. 3 shows an example of the job information generation table 24.

In the job information generation table 24 shown in FIG. 3, a circular symbol indicates that particular settings are duplicated from preliminary job information, which will be described later, to job information; an x-shaped symbol indicates that particular settings are not duplicated from preliminary job information to job information; a triangular symbol indicates that particular settings are, if included in preliminary job information, duplicated from preliminary job information to job information.

For example, for a facsimile transmission application program, job information is handled in the following manner. The job information generation table 24 in FIG. 3 dictates as follows: image input settings, edit settings, and XXX settings should be duplicated from preliminary job information to job information; destination settings as to destinations of facsimile transmission should be, when included in preliminary job information, duplicated from preliminary job information to job information; and external input settings, print output settings, YYY settings, and ZZZ settings should not be duplicated from preliminary job information to job information.

As shown in FIG. 1, the storage portion 20 stores an information management program 25 for managing access to job information, which will be described later. The information management program 25 can be installed on the MFP 10 at the stage of manufacture of the MFP 10, or can be additionally installed on the MFP 10 from a storage medium such as an SD card or a USB (universal serial bus) memory, or can be additionally installed on the MFP 10 over a network.

The control portion 30 includes, for example, a CPU (central processing unit) 31, a ROM (read-only memory) 32 having an area for storing programs and various kinds of data, and a RAM (random-access memory) 33 as memory used as an working area by the CPU 31. That is, the control portion 30 is a processor comprising one or more circuits; it can read various programs and execute them, and can execute various programs that are incorporated previously. Here, a circuit can be an electronic component or an electronic circuit board comprising a plurality of electronic devices that are interconnected by wiring. The CPU 31 executes programs stored in the ROM 32 or the storage portion 20.

The RAM 33 can store, for each of jobs executed by application software 22, job information 40 which is a collection of information used by processes of the platform software 21 (hereinafter referred to as "platform-side processes") and information used by processes of the application software 22 (hereinafter referred to as "application-side processes").

Figure 4:
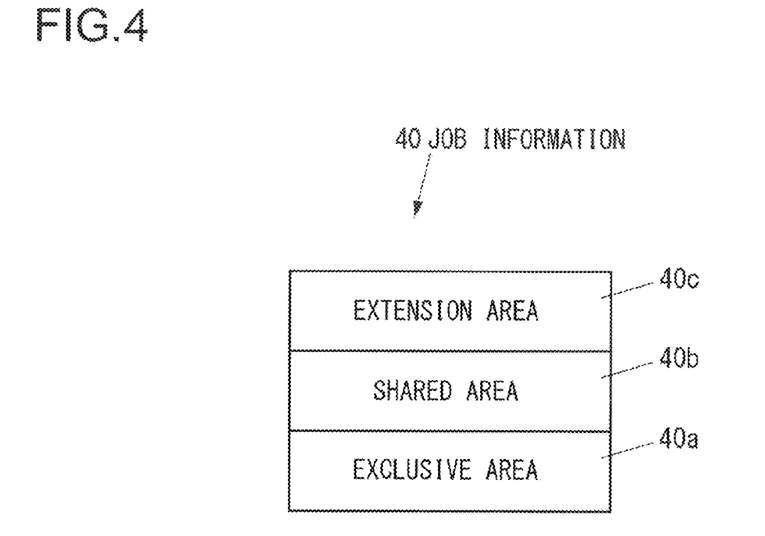
FIG. 4 shows different areas in the job information shown in FIG. 1.

FIG. 4 shows different areas in the job information 40.

As shown in FIG. 4, the job information 40 is divided into an exclusive area 40a as an area dedicated to information used by, out of platform-side and application-side processes, only platform-side processes; a shared area 40b as an area common to information used by both platform-side and application-side processes; and an extension area 40c as an area dedicated to information used by, out of platform-side and application-side processes, only application-side processes.

The exclusive area 40a is an area for confidential information that needs to be hidden from users, such as operation parameters that need to be isolated from processes used by users, that is, application-side processes.

The shared area 40b is an area where platform-side and application-side processes can share information.

The extension area 40c is an area where modifications are freely permitted according to the application software 22.

Various sets of information, such as settings, included in the job information 40 are each mapped in one of the exclusive area 40a, the shared area 40b, and the extension area 40c.

FIG. 5 shows functions performed by the control portion 30.

As shown in FIG. 5, by executing the information management program 25 (see FIG. 1) stored in the storage portion 20 (see FIG. 1), the control portion 30 functions as a job information generating device 30a for generating the job information 40 (see FIG. 1) for each of jobs executed by the application software 22 (see FIG. 1), a platform access managing device 30b as access managing means for managing access to the job information 40 from platform-side processes, and an application access managing device 30c as access managing means for managing access to the job information 40 from application-side processes.

Next, the operation (information management method) of the MFP 10 will be described.

First, a description will be given of the operation of the MFP 10 for accepting various settings for a job.

For simplicity's sake, the following description deals with a facsimile transmission application program as an example of the application software 22.

Figure 6:
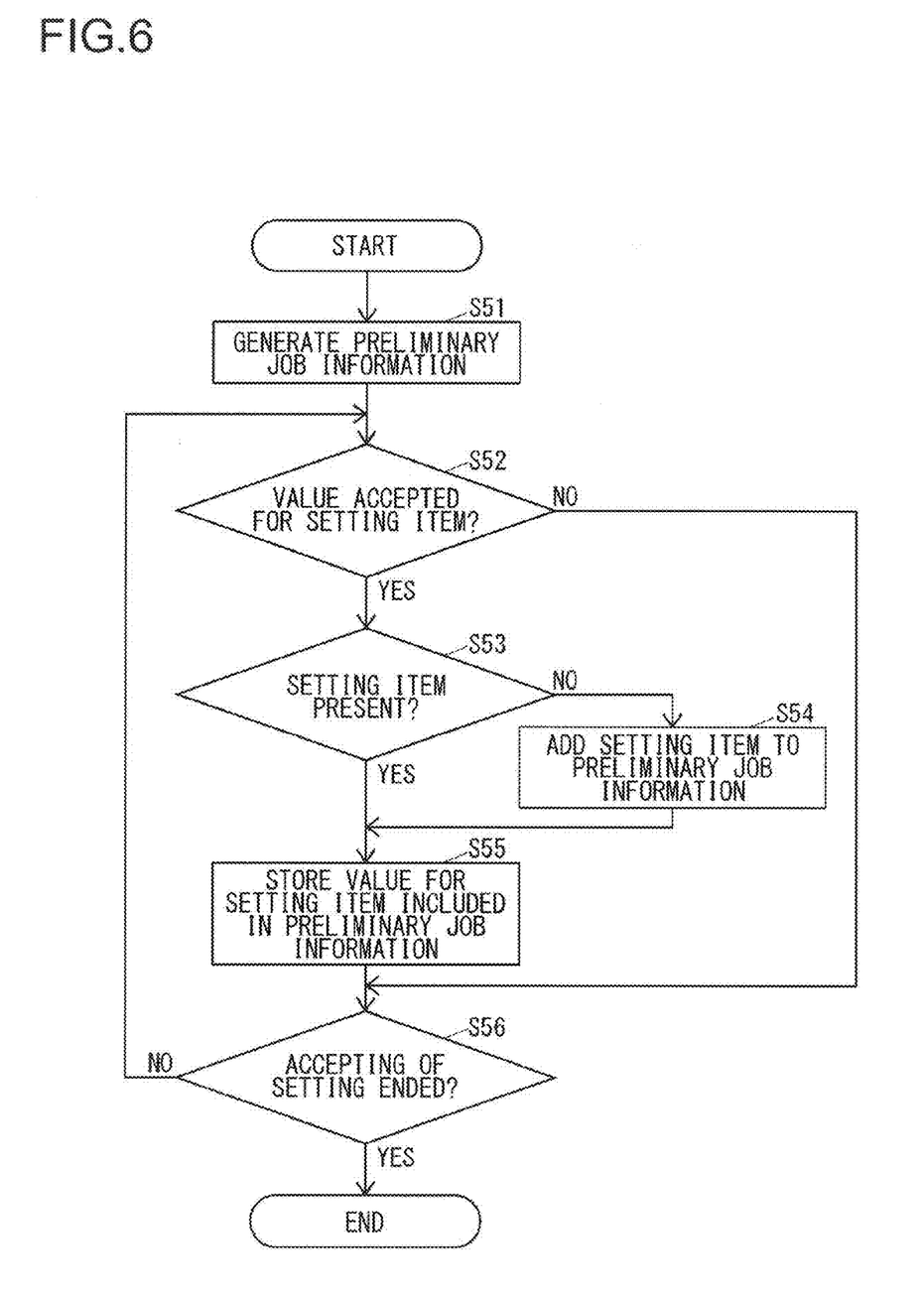
FIG. 6 shows steps through which the MFP shown in FIG. 1 accepts various settings for a job.

FIG. 6 shows steps through which the MFP 10 operates when it accepts various settings for a job.

When an instruction to start accepting various settings for a job to be executed by the facsimile transmission application program is received via the operation portion 11 or the network communication portion 16, the MFP 10 starts the procedure shown in FIG. 6.

As shown in FIG. 6, the job information generating device 30a duplicates the general job information 23 to generate preliminary job information 60 (see FIG. 7) in the RAM 33 (S51).

Figure 7:
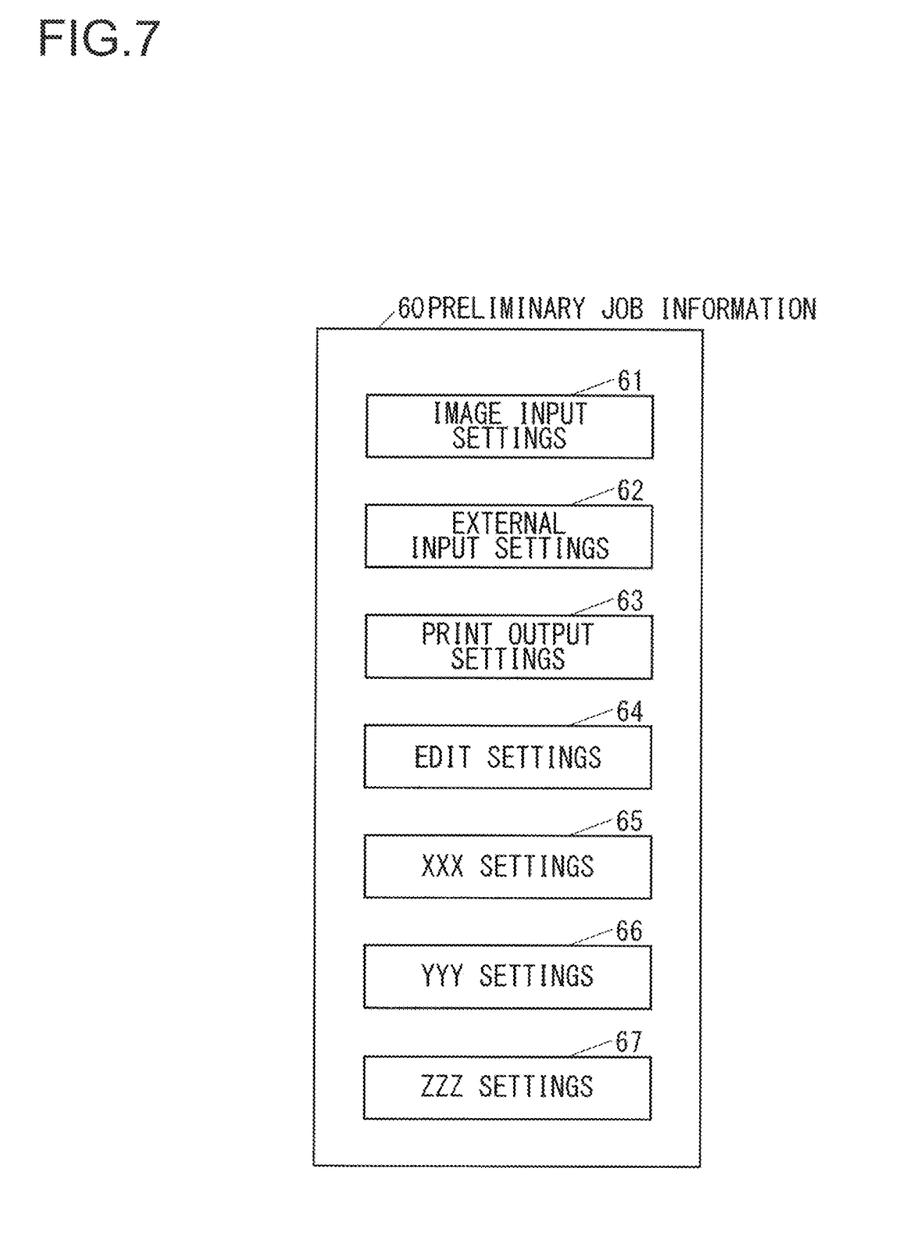
FIG. 7 shows an example of information included in the preliminary job information shown in FIG. 6.

FIG. 7 shows an example of information included in the preliminary job information 60.

As shown in FIG. 7, the preliminary job information 60 includes image input settings 61, external input settings 62, print output settings 63, edit settings 64, XXX settings 65, YYY settings 66, and ZZZ settings 67, which respectively correspond to the image input settings 23a, external input settings 23b, print output settings 23c, edit settings 23d, XXX settings 23e, YYY settings 23f, and ZZZ settings 23g included in the general job information 23.

As shown in FIG. 6, after step S51, the job information generating device 30a checks whether or not a value for a setting item has been accepted via the operation portion 11 or the network communication portion 16 (S52). Here, a setting item denotes an item for which a setting can be made, such as one among the image input settings 61.

If, at S52, the job information generating device 30a finds that a value for a setting item has been accepted, it then checks whether or not the setting item for which the value has been accepted is present in the preliminary job information 60 (S53). For example, when the preliminary job information 60 is in a state as shown in FIG. 7, items of the image input settings 61 are present in the preliminary job information 60; on the other hand, no items of destination settings related to facsimile transmission destinations are present in the preliminary job information 60 shown in FIG. 7.

Figure 8:
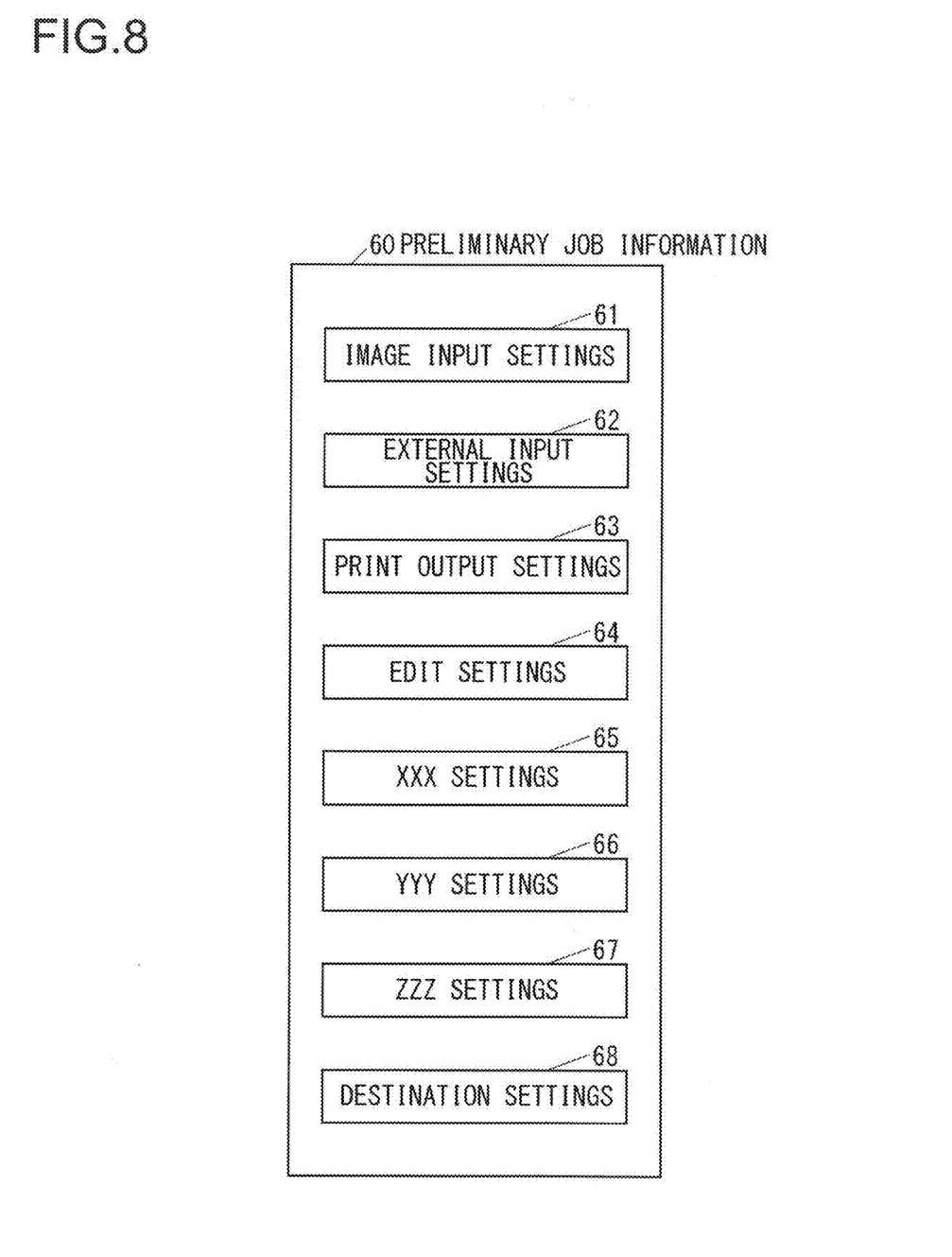
FIG. 8 shows the preliminary job information shown in FIG. 7 having destination settings added to it.

If, at S53, the job information generating device 30a finds that the setting item is absent, it then adds the setting item for which the value has been accepted to the preliminary job information 60 (S54). For example, if the setting item for which the value has been accepted is an item of destination settings, the job information generating device 30a adds items of destination settings 68 as shown in FIG. 8. The job information generating device 30a is aware of what setting items can be added.

If, at S53, the job information generating device 30a finds that the setting item is present, or on completion of step S54, it then stores the accepted value for the setting item included in the preliminary job information 60 (S55). For example, the job information generating device 30a stores a destination as a value entered by a user for an item of the destination settings 68.

If, at S52, the job information generating device 30a finds that no value for a setting item has been accepted, or on completion of step S55, it checks whether or not the accepting of a setting has ended (S56). Here, the job information generating device 30a recognizes an end of the accepting of a setting when an instruction to end accepting a setting is entered via the operation portion 11 or the network communication portion 16. An instruction to end accepting a setting can be substituted for by an instruction to execute an intended job.

If, at S56, the job information generating device 30a finds that the accepting of a setting has not ended, it then executes step S52.

If, at S56, the job information generating device 30a finds that the accepting of a setting has ended, the procedure shown in FIG. 6 ends.

Next, a description will be given of the operation (information management method) of the MFP 10 for generating job information.

For simplicity's sake, the following description again deals with a facsimile transmission application program as an example of the application software 22.

Figure 9:
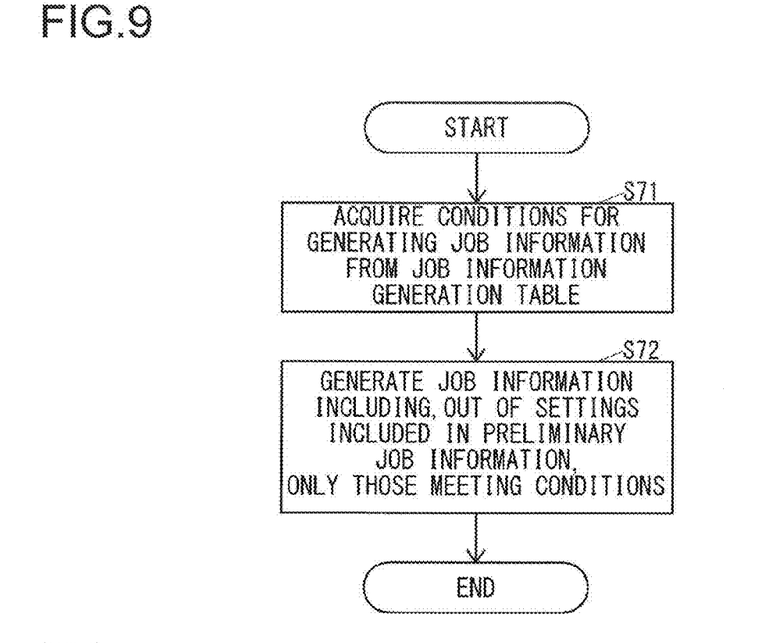
FIG. 9 shows steps through which the MFP shown in FIG. 1 operates when it generates job information.

FIG. 9 shows the steps through which the MFP 10 generates job information.

When an instruction to execute a job to be executed by the facsimile transmission application program is received via the operation portion 11 or the network communication portion 16, the MFP 10 starts the procedure shown in FIG. 9.

As shown in FIG. 9, the job information generating device 30a acquires conditions for generating job information 40 from the job information generation table 24 (S71). For example, according to the job information generation table 24 shown in FIG. 3, the job information generating device 30a acquires, with respect to the facsimile transmission application program, conditions dictating that "image input settings, edit settings, and XXX settings should be duplicated from preliminary job information 60 to job information 40; destination settings as to destinations of facsimile transmission should be, when included in preliminary job information 60, duplicated from preliminary job information 60 to job information 40; and external input settings, print output settings, YYY settings, and ZZZ settings should not be duplicated from preliminary job information 60 to job information 40".

Next, the job information generating device 30a generates, in the RAM 33, job information 40 that includes, out of the settings included in the preliminary job information 60, only those settings which meet the conditions acquired at S71 (S72). For example, with respect to the facsimile transmission application program, the job information generating device 30a generates the job information 40 shown in FIG. 10 based on the preliminary job information 60 shown in FIG. 8.

Figure 10:
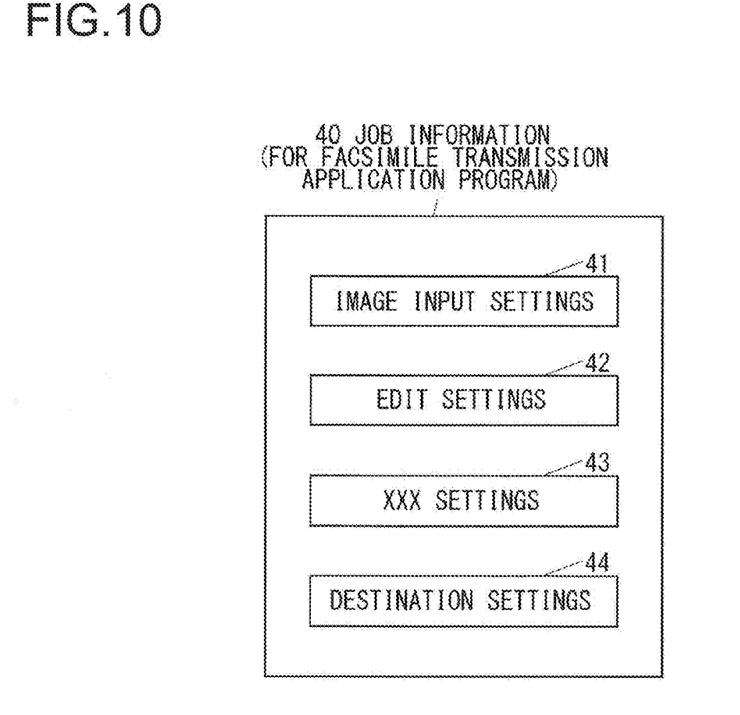
FIG. 10 shows an example of information included in the job information shown in FIG. 1.

FIG. 10 shows an example of information included in the job information 40.

The job information 40 shown in FIG. 10 is job information for the facsimile transmission application program. As shown in FIG. 10, the job information 40 for the facsimile transmission application program includes, as settings for use by the facsimile transmission application program, image input settings 41, edit settings 42, XXX settings 43, and destination settings 44 duplicated by the job information generating device 30a (see FIG. 5) respectively from the image input settings 61 (see FIG. 8), edit settings 64 (see FIG. 8), XXX settings 65 (see FIG. 8), and destination settings 68 (see FIG. 8) in the preliminary job information 60 (see FIG. 8). The job information generating device 30a also duplicates various kinds of information other than settings used by the application software from the preliminary job information 60 to the job information 40.

On completing the generation of the job information 40, the job information generating device 30a deletes from the RAM 33 the preliminary job information 60 used to generate the job information 40.

As shown in FIG. 9, on completion of step S72, the job information generating device 30a ends the procedure shown in FIG. 9.

Next, a description will be given of the operation (information management method) of the MFP 10 when the application software 22 executes a job.

For simplicity's sake, the following description deals with a display application program as an example of the application software 22. When, as the application software 22, the display application program is run, the information used by processes includes the following items: information on a compression method for images displayed on the display portion 12; information for controlling the display portion 12; information on layouts of screens displayed on the display portion 12; etc. The information on a compression method for images displayed on the display portion 12 is included, for example, in the exclusive area 40*a*. The information for controlling the display portion 12 is included, for example, in the shared area 40*b*. The information on layouts of screens displayed on the display portion 12 is included, for example, in the extension area 40*c*.

Figure 11:
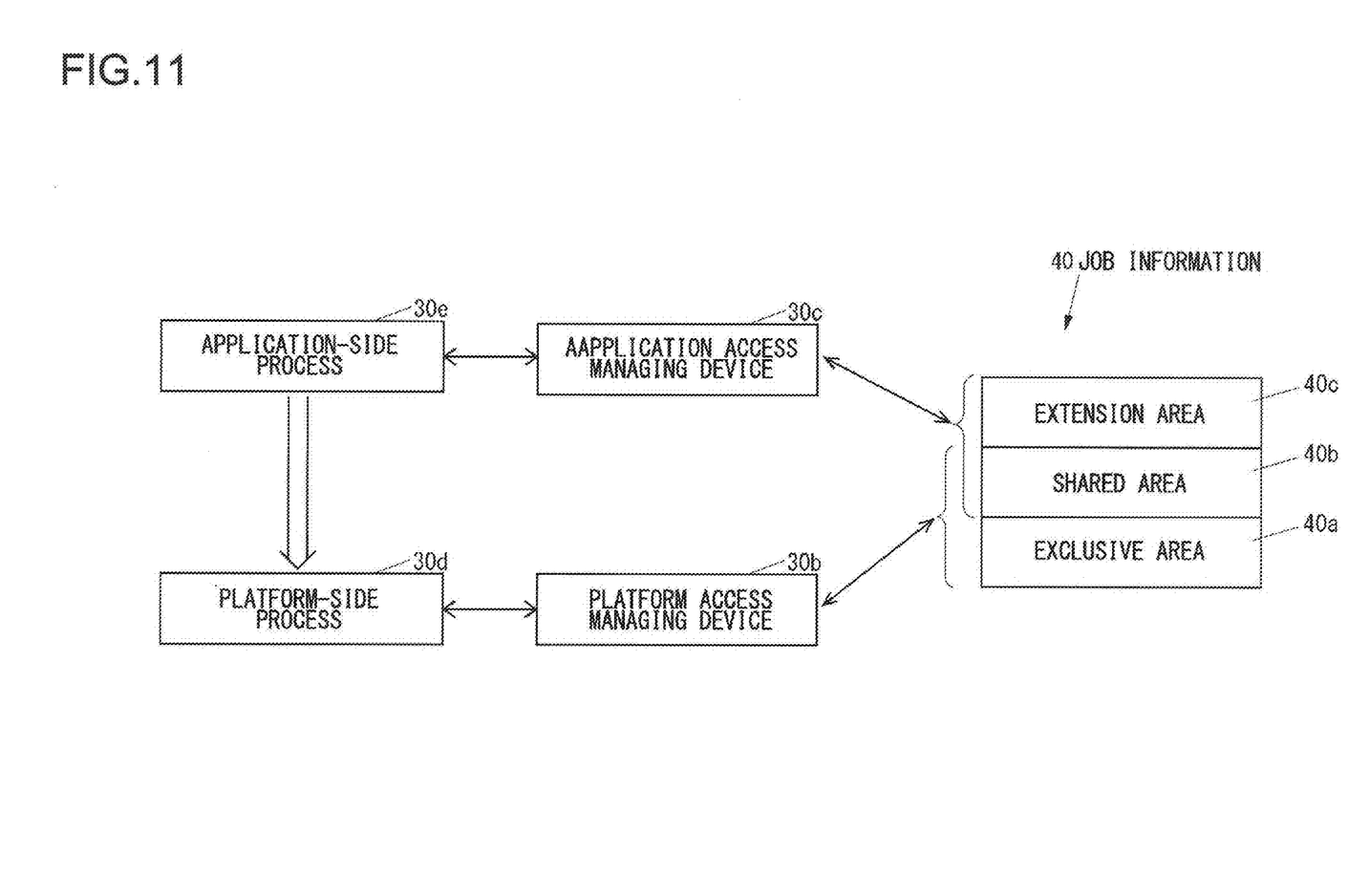
FIG. 11 shows steps through which the MFP shown in FIG. 1 handles application software.

FIG. 11 shows the steps through which the MFP 10 handles the application software 22.

As shown in FIG. 11, the control portion 30 (see FIG. 1) executes the platform software 21 (see FIG. 1) to generate platform-side processes 30*d*, and executes the application software 22 (see FIG. 1) to generate application-side processes 30*e*.

When the control portion 30 executes the application software 22, processes are run such that application-side processes 30*e* use platform-side processes 30*d*.

When an application-side process 30*e*, while performing processing, needs to set information in the job information 40 or acquire information from the job information 40, it notifies the application access managing device 30*c* of a request for access to the job information 40. Here, the application-side process 30*e* can access, out of all the areas in the job information 40, only the shared area 40*b* and the extension area 40*c*. When notified of the request for access to the job information 40 from the application-side process 30*e*, the application access managing device 30*c* starts the procedure shown in FIG. 12.

Figure 12:
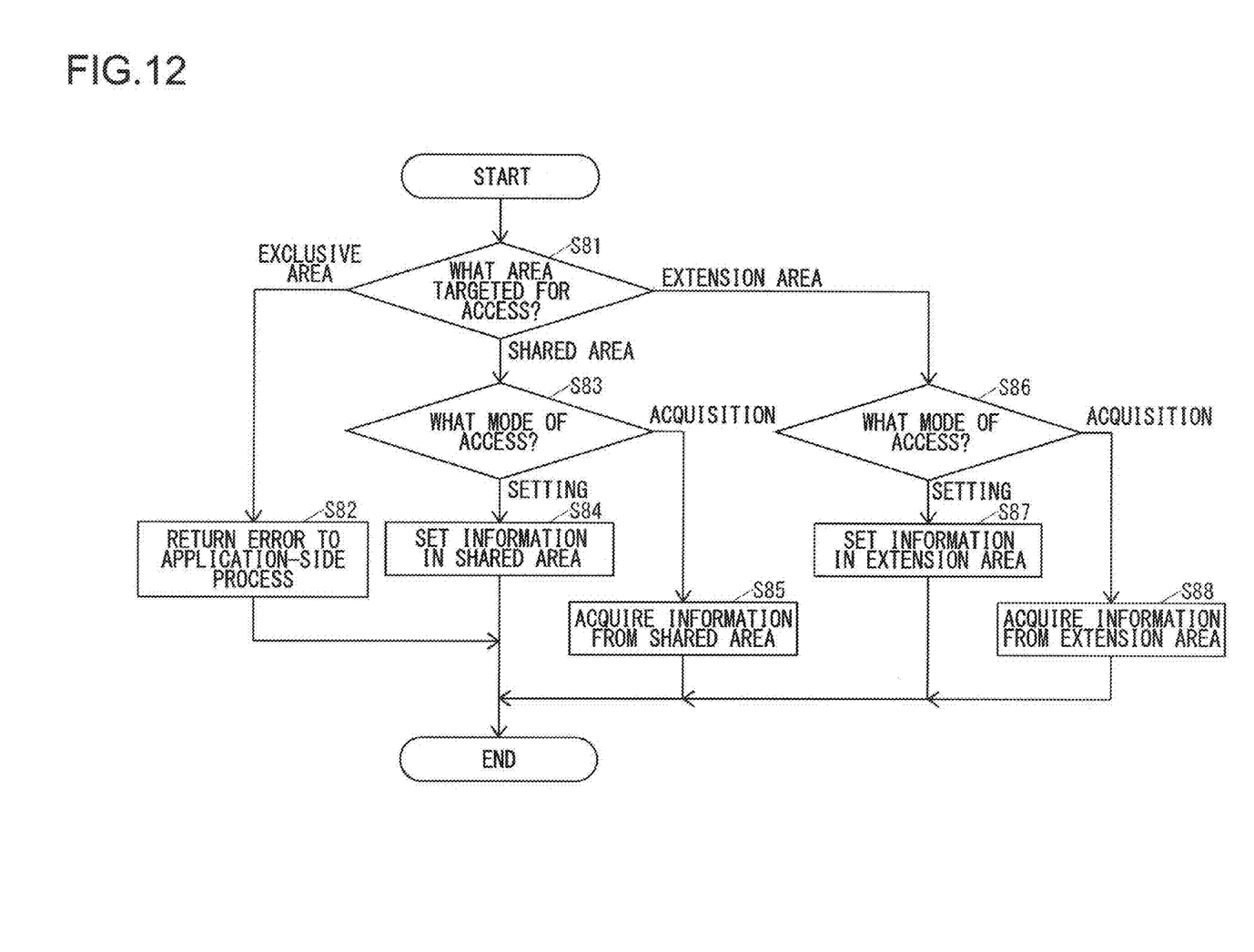
FIG. 12 shows steps through which the application access managing device shown in FIG. 11 operates.

FIG. 12 shows the steps through which the application access managing device 30*c* operates.

As shown in FIG. 12, the application access managing device 30*c* checks which of the exclusive area 40*a*, the shared area 40*b*, and the extension area 40*c* is the area that includes an item of information targeted by the request for access notified from the application-side process 30*e* (S81).

If the item of information targeted by the request for access notified from the application-side process 30*e* is, for example, "information on a compression method for images displayed on the display portion 12", then, since the items of information in the shared area 40*b* and the extension area 40*c* which the application access managing device 30*c* itself manages do not include "information on a compression method for images displayed on the display portion 12", the application access managing device 30*c* concludes, at S81, that it is in the exclusive area 40*a*, and returns an error to the application-side process 30*e* (S82), then ending the procedure shown in FIG. 12. On receiving the error from the application access managing device 30*c*, the application-side process 30*e* behaves in a particular manner expected on occurrence of an error.

If the item of information targeted by the request for access notified from the application-side process 30*e* is, for example, "information for controlling the display portion 12", then, since the items of information in the shared area 40*b* which the application access managing device 30*c* itself manages include "information for controlling the display portion 12", the application access managing device 30*c* concludes, at S81, that it is in the shared area 40*b*, and then checks whether the mode of access notified from the application-side process 30*e* is setting or acquisition (S83).

If, at S83, the application access managing device 30*c* finds that the requested mode of access is setting, it permits the application-side process 30*e* to set information in the shared area 40*b* (S84), and then ends the procedure shown in FIG. 12.

If, at S83, the application access managing device 30*c* finds that the requested mode of access is acquisition, it permits the application-side process 30*e* to acquire information from the shared area 40*b* (S85), and then ends the procedure shown in FIG. 12.

If the item of information targeted by the request for access notified from the application-side process 30*e* is, for example, "information on layouts of screens displayed on the display portion 12", then, since the items of information in the extension area 40*c* which the application access managing device 30*c* itself manages include "information on layouts of screens displayed on the display portion 12", the application access managing device 30*c* concludes, at S81, that it is in the extension area 40*c*, and then checks whether the mode of access notified from the application-side process 30*e* is setting or acquisition (S86).

If, at S86, the application access managing device 30*c* finds that the requested mode of access is setting, it permits the application-side process 30*e* to set information in the extension area 40*c* (S87), and then ends the procedure shown in FIG. 12.

If, at S86, the application access managing device 30*c* finds that the requested mode of access is acquisition, it permits the application-side process 30*e* to acquire information from the extension area 40*c* (S88), and then ends the procedure shown in FIG. 12.

In the manner described above, the application access managing device 30*c* manages access to, out of all the areas in the job information 40, the shared area 40*b* and the extension area 40*c*.

As shown in FIG. 11, when a platform-side process 30*d*, while performing processing, needs to set information in the job information 40 or acquire information from the job information 40, it notifies the platform access managing device 30*b* of a request for access to the job information 40. Here, the platform-side process 30*d* can access, out of all the areas in the job information 40, only the exclusive area 40*a* and the shared area 40*b*. When notified of the request for access to the job information 40 from the platform-side process 30*d*, the platform access managing device 30*b* starts the procedure shown in FIG. 13.

Figure 13:
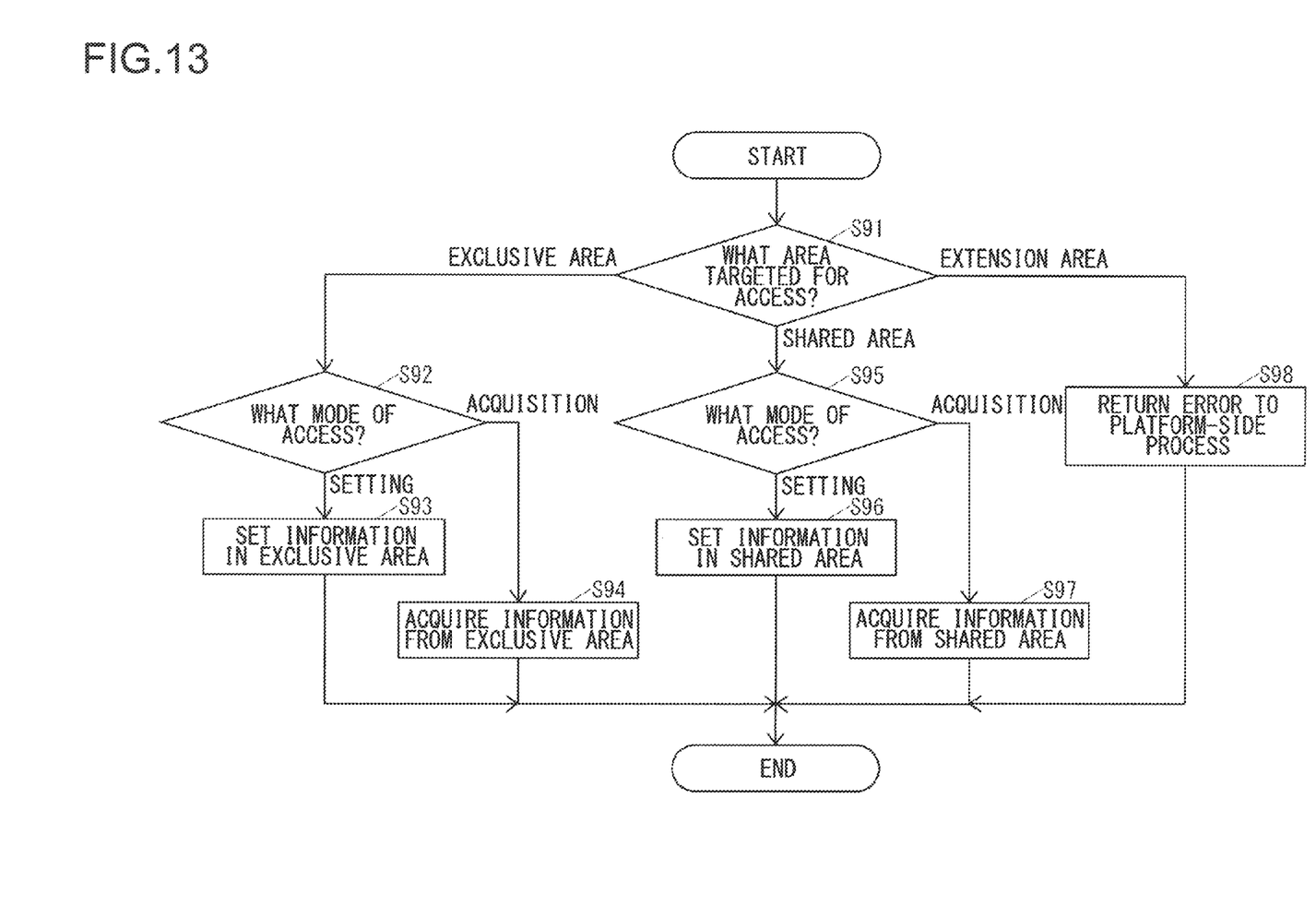
FIG. 13 shows steps through which the platform access managing device shown in FIG. 11 operates.

FIG. 13 shows the steps through which the platform access managing device 30*b* operates.

As shown in FIG. 13, the platform access managing device 30*b* checks which of the exclusive area 40*a*, the shared area 40*b*, and the extension area 40*c* is the area that includes an item of information targeted by the request for access notified from the platform-side process 30*d* (S91).

If the item of information targeted by the request for access notified from the platform-side process 30*d* is, for example, "information on a compression method for images displayed on the display portion 12", then, since the items of information in the exclusive area 40*a* which the platform access managing device 30*b* itself manages include "information on a compression method for images displayed on the display portion 12", the platform access managing device 30*b* concludes, at S91, that it is in the exclusive area 40*a*, and then checks whether the mode of access notified from the platform-side process 30*d* is setting or acquisition (S92).

If, at S92, the platform access managing device 30*b* finds that the requested mode of access is setting, it permits the platform-side process 30*d* to set information in the exclusive area 40*a* (S93), and then ends the procedure shown in FIG. 13.

If, at S92, the platform access managing device 30*b* finds that the requested mode of access is acquisition, it permits the platform-side process 30*d* to acquire information from the exclusive area 40*a* (S94), and then ends the procedure shown in FIG. 13.

If the item of information targeted by the request for access notified from the platform-side process 30*d* is, for example, "information for controlling the display portion 12", then, since the items of information in the shared area 40*b* which the platform access managing device 30*b* itself manages include "information for controlling the display portion 12", the platform access managing device 30*b* concludes, at S91, that it is in the shared area 40*b*, and then checks whether the mode of access notified from the platform-side process 30*d* is setting or acquisition (S95).

If, at S95, the platform access managing device 30*b* finds that the requested mode of access is setting, it permits the platform-side process 30*d* to set information in the shared area 40*b* (S96), and then ends the procedure shown in FIG. 13.

If, at S95, the platform access managing device 30*b* finds that the requested mode of access is acquisition, it permits the platform-side process 30*d* to acquire information from the shared area 40*b* (S97), and then ends the procedure shown in FIG. 13.

If the item of information targeted by the request for access notified from the platform-side process 30*d* is, for example, "information on layouts of screens displayed on the display portion 12", then, since the items of information in the exclusive area 40*a* and the shared area 40*b* which the platform access managing device 30*b* itself manages do not include "information on layouts of screens displayed on the display portion 12", the platform access managing device 30*b* concludes, at S91, that it is in the extension area 40*c*, and returns an error to the platform-side process 30*d* (S98), then ending the procedure shown in FIG. 13. On receiving the error from the platform access managing device 30*b*, the platform-side process 30*d* behaves in a particular manner expected on occurrence of an error.

In the manner described above, the platform access managing device 30*b* manages access to, out of all the areas in the job information 40, the exclusive area 40*a* and the shared area 40*b*.

As described above, in the MFP 10, when job information 40 is generated in the RAM 33 for use by the application software 22 during job execution, it is so generated as to include, out of general settings, only those settings which are used by particular application software 22 that executes the job (S72). That is, the MFP 10 can optimally configure the job information 40 to suit different application software 22. Thus, the job information 40 used by the application software 22 during the execution of a particular kind of job is prevented from including such settings as are not used during the execution of that job. For example, the job information 40 used by the facsimile transmission application program is prevented from including external input settings, print output settings, YYY settings, and ZZZ settings which are not used during the execution of a job by the facsimile transmission application program. In this way, the MFP 10 can reduce the amount of RAM 33 occupied by the job information 40.

The MFP 10 can accept addition of a setting item to the preliminary job information 60 before generating the job information 40 (S54). This helps reduce the number of setting items included in the general job information 23. For example, the general job information 23 can be prevented from including items related to address settings. Thus, the MFP 10 can reduce the amount of RAM 33 occupied by the preliminary job information 60 when the preliminary job information 60 is generated in the RAM 33.

As for a setting item to be added to the preliminary job information 60, unless it is actually added to the preliminary job information 60, it is not reflected in the job information 40; thus, based on the fact that a particular setting item is not included in the job information 40, the MFP 10 can recognize that no corresponding setting has been accepted. For example, if no item of destination settings is included in the job information 40 during the execution of a job by the facsimile transmission application program, the MFP 10 can recognize that no destination has been entered.

The MFP 10 permits access to the exclusive area 40*a* only from platform-side processes 30*d* (S93 and S94). Thus, the information in the exclusive area 40*a* can be hidden from application-side processes 30*e*. That is, the MFP 10 can hide information on the basis of the type of processes.

In particular, the MFP 10 can hide information used by processes of, out of the platform software 21 and the application software 22, the platform software 21, that is, information used by platform-side processes 30*d* alone, from processes of the application software 22 directly used by users, that is, the application-side processes 30*e*. It is thus possible to hide confidential information from users. For example, in a case where information on a compression method for images displayed on the display portion 12 is important information that a manufacturer of the MFP 10 wants to keep confidential from users, the manufacturer can adopt a design in which information on a compression method for images displayed on the display portion 12 is mapped in the exclusive area 40*a* for a line of MFP products embracing a plurality of models including the MFP 10, and thereby the manufacturer can hide the information on a compression method for images displayed on the display portion 12 from users.

The MFP 10 permits access to the extension area 40*c* only from processes of the application software 22, that is, from application-side processes 30*e*. Thus, in the information stored in the extension area 40*c*, it is possible to adopt definitions unique to the application software 22 irrespective of the platform software 21. That is, the MFP 10 can expand definitions in the information used by processes to suit the application software 22. For example, a manufacturer of the MFP 10 can modify information on layouts of screens displayed on the display portion 12 to information unique to, out of a line of MFP products embracing a plurality of models including the MFP 10, the model to which the MFP 10 belongs. A manufacturer of the MFP 10 cannot modify data types, like integer, character, etc., with respect to the information in the exclusive area 40*a* used by platform-side processes 30*d* alone and the information in the shared area 40*b* used not only by application-side processes 30*e* but also by platform-side processes 30*d*, but can modify data types with respect to the information in the extension area 40*c* used by application-side processes 30*e* alone so as to suit the application software 22.

Having the shared area 40*b* in the job information 40, the MFP 10 can smoothly transfer from an application-side process 30*e* to a platform-side process 30*d* via the shared area 40*b* the information necessary when the application-side process 30*e* requests the platform-side process 30*d* to perform processing, and in addition can refer to any information in the shared area 40*b* modified by the platform-side process 30*d* from the application-side process 30*e*.

In this embodiment, on completion of the generation of the job information 40, the job information generating device 30*a* in the MFP 10 deletes the preliminary job information 60 used to generate the job information 40 from the RAM 33. However, on completion of the generation of the job information 40, the job information generating device 30*a* does not necessarily have to delete the preliminary job information 60 used to generate the job information 40 from the RAM 33. In a configuration where the job information generating device 30*a* does not delete the preliminary job information 60 used to generate the job information 40 from the RAM 33, it can use the preliminary job information 60 left in the RAM 33 again to generate job information 40 for a subsequent job. Incidentally, cases where the preliminary job information 60 used to generate the job information 40 can be used again includes, for example, a case where a plurality of jobs are executed consecutively by the same application software 22, and a case where, after one job is executed by the application software 22, another job is executed by the application software 22 that has executed the one job. In a configuration where the job information generating device 30*a* does not delete the preliminary job information 60 used to generate the job information 40 from the RAM 33 but leaves it there, if, when the job information generating device 30*a* generates new preliminary job information 60 in the RAM 33, there is insufficient space in the RAM 33 for the new preliminary job information 60, it can delete the preliminary job information 60 left in the RAM 33 to secure sufficient space in the RAM 33 for the new preliminary job information 60, or can overwrite the preliminary job information 60 in the RAM 33 with the newly generated preliminary job information 60.

In this embodiment, the MFP 10 generates new job information 40 separately from the preliminary job information 60; instead, the preliminary job information 60 can be regenerated as job information 40 by deleing particular settings from the preliminary job information 60.

Although the embodiment deals with an MFP as an electronic device according to the present disclosure, it can be any image forming apparatus other than an MFP, such as a dedicated printer, a dedicated copier, or a dedicated facsimile machine, so long as it is an electronic device that accesses job information, or any electronic device other than an image forming apparatus, such as a PC (personal computer).

As described above, an electronic device according to the present disclosure includes a job information generating device and an access managing device. The job information generating device duplicates general job information including general setting items to generate preliminary job information, accepts, for the job, values for setting items included in the preliminary job information, and then generates the job information such that it includes, out of settings included in the preliminary job information, only settings used by the application software. Thus, when job information is generated in memory for use by the application software during the execution of a job, it is so generated as to include, out of general settings, only those settings which are used by the application software that executes the job. It is thus possible to reduce the amount of memory occupied by the job information.

In the electronic device configured as described above, the job information generating device can, before generating the job information, accept addition of setting items to the preliminary job information. With this configuration, it is possible to reduce the number of setting items included in the general job information; it is thus possible to reduce the amount of memory occupied by the preliminary job information when this is generated in the memory by duplicating the general job information.

With an information management program and an information management method according to the present disclosure, when job information is generated in memory for use by application software during the execution of a job, it is so generated as to include, out of general settings, only those which are used by the application software that executes the job. It is thus possible to reduce the amount of memory occupied by the job information.

That is, with an electronic device, an information management program, and an information management method according to the present disclosure, it is possible to reduce the amount of memory occupied by job information.

What is claimed is:

1. An electronic device comprising:
   an input device to which an operation by a user is input;
   a network communication device which performs processing for communication with an external device via a network;
   a non-transitory storage device including general setting items as settings used by a plurality of application software programs respectively;
   a job information generating device which performs processing to generate, for each job executed by application software, job information including settings for the job used by the application software that executes the job; and
   an access managing device which performs processing to manage, when the job is executed, access to the job information from the application software,
   wherein
   the job information generating device performs processing to
      duplicate the general job information to generate preliminary job information,
      accept, for the job, values for setting items included in the preliminary job information via at least one of the input device and the network communication device, and then
      generate the job information such that the job information includes, out of settings included in the preliminary job information, only settings used by the application software,
   when the job information generating device accepts values for setting items corresponding to the application software that executes the job and not included in the preliminary job information via the at least one of the input device and the network communication device, then the job information generating device adds the setting item to the preliminary job information before generating the job information,
   the electronic device further comprises a job information generation table that indicates, for each of the plurality of application software programs,
      a first setting that is duplicated from the preliminary job information to the job information,
      a second setting that is not duplicated from the preliminary job information to the job information, and
      a third setting that, if included in the preliminary job information, is duplicated from the preliminary job information to the job information, and
   when generating the job information, based on the job information generation table, the job information generating device duplicates from the preliminary job information to the job information, out of the settings included in the preliminary job information, the first setting corresponding to the application software that executes the job and, if the third setting corresponding to the application software that executes the job has been added to the preliminary job information, the third setting, but not the second setting.

2. The electronic device of claim 1, further comprising a memory, wherein the job information generating device stores the preliminary job information used to generate the job information in the memory, uses the stored preliminary job information again when the application software that executes the job executes another job, and if the preliminary job information is stored in the memory and if the memory has no sufficient space for new preliminary job information, stores the new preliminary job information by deleting or overwriting the stored preliminary job information.

3. The electronic device of claim 1, wherein the job information generating device generates the job information when an instruction to execute the job is entered via the input device or the network communication device.

4. A non-transitory computer-readable storage medium which stores an information management program executable by a computer of an electronic device, wherein when the information management program is executed, the information management program makes the computer operate as a job information generating device which generates, for each job executed by application software, job information including settings for the job used by the application software that executes the job and an access managing device which manages, when the job is executed, access to the job information from the application software, wherein the job information generating device duplicates the general job information to generate preliminary job information, accepts, for the job, values for setting items included in the preliminary job information via at least one of the input device and the network communication device, and then generates the job information such that the job information includes, out of settings included in the preliminary job information, only settings used by the application software, when the job information generating device accepts values for setting items corresponding to the application software that executes the job and not included in the preliminary job information via the at least one of the input device and the network communication device, then the job information generating device adds the setting item to the preliminary job information before generating the job information, the electronic device includes a job information generation table that indicates, for each of the plurality of application software programs, a first setting that is duplicated from the preliminary job information to the job information, a second setting that is not duplicated from the preliminary job information to the job information, and a third setting that, if included in the preliminary job information, is duplicated from the preliminary job information to the job information, and when generating the job information, based on the job information generation table, the job information generating device duplicates from the preliminary job information to the job information, out of the settings included in the preliminary job information, the first setting corresponding to the application software that executes the job and, if the third setting corresponding to the application software that executes the job has been added to the preliminary job information, the third setting, but not the second setting.

5. The storage medium of claim 4, wherein the electronic device further includes a memory, and the job information generating device stores the preliminary job information used to generate the job information in the memory, uses the stored preliminary job information again when the application software that executes the job executes another job, and if the preliminary job information is stored in the memory and if the memory has no sufficient space for new preliminary job information, stores the new preliminary job information by deleting or overwriting the stored preliminary job information.

6. The storage medium of claim 4, wherein the job information generating device generates the job information when an instruction to execute the job is entered via the input device or the network communication device.

7. An information management method which enables an electronic device to function, wherein the electronic device includes:

an input device to which an operation by a user is input;

a network communication device which performs processing for communication with an external device via a network;

a non-transitory storage device including general setting items as settings used by a plurality of application software programs respectively;

a job information generating device which performs processing to generate, for each job executed by application software, job information including settings for the job used by the application software that executes the job; and an access managing device which performs processing to manage, when the job is executed, access to the job information from the application software, by using the job information generating device, the information management method performs processing to duplicate the general job information to generate preliminary job information, accept, for the job, values for setting items included in the preliminary job information via at least one of the input device and the network communication device, and then generate the job information such that the job information includes, out of settings included in the preliminary job information, only settings used by the application software, by using the job information generating device, the information management method, on accepting values for setting items corresponding to the application software that executes the job and not included in the preliminary job information via the at least one of the input device and the network communication device, adds the setting item to the preliminary job information before generating the job information, the electronic device includes a job information generation table that indicates, for each of the plurality of application software programs,
- a first setting that is duplicated from the preliminary job information to the job information,
- a second setting that is not duplicated from the preliminary job information to the job information, and
- a third setting that, if included in the preliminary job information, is duplicated from the preliminary job information to the job information, and by using the job information generating device, the information management method, when generating the job information, based on the job information generation table, duplicates from the preliminary job information to the job information, out of the settings included in the preliminary job information,
- the first setting corresponding to the application software that executes the job and,
- if the third setting corresponding to the application software that executes the job has been added to the preliminary job information, the third setting, but not the second setting.

8. The information management method of claim 7, wherein the electronic device further includes a memory, and by using the job information generating device, the information management method
- stores the preliminary job information used to generate the job information in the memory,
- uses the stored preliminary job information again when the application software that executes the job executes another job, and
- if the preliminary job information is stored in the memory and if the memory has no sufficient space for new preliminary job information, stores the new preliminary job information by deleting or overwriting the stored preliminary job information.

9. The information management method of claim 7, wherein by using the job information generating device, the information management method generates the job information when an instruction to execute the job is entered via the input device or the network communication device.

* * * * *